United States Patent [19]

Lester et al.

[11] 4,256,348

[45] Mar. 17, 1981

[54] ALUMINUM ALLOY MOTORCYCLE WHEEL HAVING AN EXTRUDED RIM SHRINK FITTED AND RESIN BONDED TO A DIE CAST HUB-SPOKE UNIT

[75] Inventors: Thomas J. Lester, Beachwood; Theodore C. Ptacek, Northfield, both of Ohio

[73] Assignee: Lester Industries, Inc., Bedford, Ohio

[21] Appl. No.: 45,591

[22] Filed: Jun. 4, 1979

Related U.S. Application Data

[63] Continuation of Ser. No. 842,586, Oct. 17, 1977, abandoned.

[51] Int. Cl.³ .................... B60B 1/08; B60B 23/00
[52] U.S. Cl. .................... 301/64 R; 301/63 R; 301/65; 301/97; 29/159.03; 29/DIG. 35; 403/273
[58] Field of Search ............ 301/65, 6 V, 63 R, 64 R, 301/97; 29/159.1, 159.01, 159.03, DIG. 35, 447, 469.5; 156/84–86, 294; 403/273

[56] References Cited

U.S. PATENT DOCUMENTS

| | | | |
|---|---|---|---|
| 2,215,424 | 9/1940 | Klein | 29/DIG. 35 |
| 3,172,787 | 3/1965 | Martenet | 29/159.1 X |
| 3,859,704 | 1/1975 | Nason | 301/63 R X |
| 3,910,638 | 10/1975 | Scott | 301/63 R |

FOREIGN PATENT DOCUMENTS 533769 10/1976 U.S.S.R. .................... 403/473

Primary Examiner—Charles A. Marmor
Attorney, Agent, or Firm—Maky, Renner, Otto & Boisselle

[57] ABSTRACT

A lightweight motorcycle wheel and method of making the same comprising a die cast alumnium alloy hub and spoke unit around which an extruded aluminum alloy drop center rim is shrinkfitted and bonded by high strength thermosetting resin adhesive between coaxial cylindrical walls of said rim and unit.

2 Claims, 6 Drawing Figures

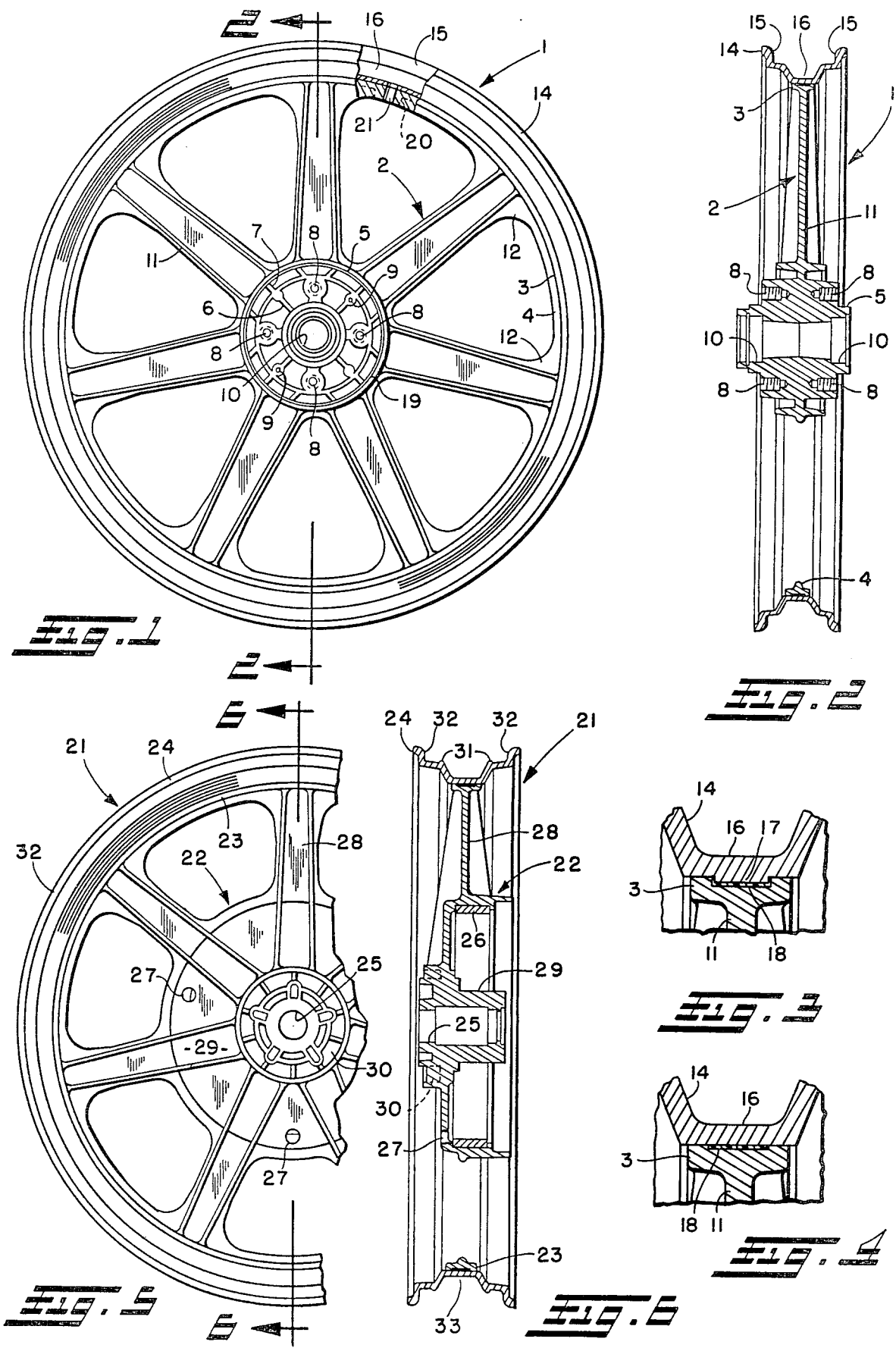

ALUMINUM ALLOY MOTORCYCLE WHEEL HAVING AN EXTRUDED RIM SHRINK FITTED AND RESIN BONDED TO A DIE CAST HUB-SPOKE UNIT

This is a continuation of application Ser. No. 842,586 filed Oct. 17, 1977, now abandoned.

BACKGROUND OF THE INVENTION

It is known to provide automobile wheels comprising roll-formed steel rims and steel hub-spoke castings which are pressfitted and welded together or comprising such steel rims and aluminum castings which are pressfitted together and locked as by dimpling the rims into peripheral depressions in the castings or by providing steel plugs in radial holes in the castings welded to the inside diameters of the rims. For examples of automobile wheels of the character indicated, reference may be had to the U.S. Pat. Nos. 3,484,137, 3,635,529, and No. 3,807,805.

In the manufacture of automobile wheel rims of the character indicated, strip steel stock is roll-formed to rim cross-section and into circular form followed by welding together of the ends and pressfitting the rim around the machined outside diameter of the casting. Accordingly, in a roll-formed steel rim, it is not possible to obtain optimum metal distribution as required to best withstand the stresses and strains imposed on the finished wheel in use. Moreover, a roll-formed steel rim is weaker in some directions than in others. Furthermore, the roll-forming of the steel strip to the desired rim cross-section entails relatively sharp angle bending of the strip so as to impose severe tensile stresses on the outside of the angles and severe compressive stresses on the inside of the angles.

Aside from the foregoing, in some known automobile wheels having roll-formed steel rims and cast aluminum hub and spoke units, the latter have steel inserts providing tabs for welding to the steel rims.

SUMMARY OF THE INVENTION

In contradistinction to the foregoing the present invention provides a lightweight motorcycle wheel which has an extruded aluminum alloy drop center rim and a die cast aluminum alloy hub-spoke unit, said rim and unit being shrinkfitted and bonded together.

The present invention also provides a novel method of manufacturing a lightweight motorcycle wheel in which the tire bead supporting surfaces of the extruded rim are true circles coaxial with the bearing bore of the die cast hub-spoke unit.

To impart improved fatigue characteristics to the lightweight motorcycle wheel herein the shrinkfitted extruded rim and die cast hub and spoke unit are bonded together by a high strength thermosetting adhesive confined in a radially thin annular chamber defined between widely axially spaced apart shrinkfitted surfaces of the rim and hub and spoke unit.

Other objects and advantages will appear from the ensuing description.

BRIEF DESCRIPTION OF THE DRAWING

FIG. 1 is a side elevation view of a motorcycle front wheel embodying the present invention.

FIG. 2 is a cross-section view taken substantially along the line 2—2, FIG. 1;

FIG. 3 is an enlarged fragmentary radial cross-section view illustrating one form of shrinkfitted and bonded joint of the rim and hub-spoke unit;

FIG. 4 is similar to FIG. 3 except showing another form shrinkfitted and bonded joint of the rim and hub-spoke unit;

FIG. 5 is a side elevation view of a motorcycle rear wheel embodying the present invention; and FIG. 6 is a cross-section view taken substantially along the line 6—6, FIG. 5.

DETAILED DESCRIPTION OF THE PREFERRED EMBODIMENTS

FIGS. 1 and 2 illustrate a lightweight front wheel 1 for a motorcycle, said wheel 1 comprising a die cast aluminum alloy hub and spoke unit 2 to provide: a continuous outer ring portion 3 having a radially inwardly extending reinforcing flange 4; a central hub portion 5 of lightweight hollow construction reinforced by webs 6 and 7 and having tapped holes 8 on opposite sides thereof for brake disc mounting screws. In the event that the wheel 1 is to have but one brake disc, the other side of the wheel 1 will be covered by a suitable cover plate (not shown) attached as by screws having threaded engagement with the tapped holes 9. The hub portion 5 has a central bearing bore 10 for mounting of the front axle in well-known manner in suitable antifriction bearings retained in the bearing bore 10. Interconnecting the hub portion 5 and the outer ring portion 3 are seven integral spokes 11 of decreasing I cross-section from the hub portion 5 to the ring portion 3. Said spokes 11 are joined to the outer ring portion 3 by generously rounded gussets or continuations 12 of the flange 4.

Shrinkfitted on the hub and spoke unit 2 is an extruded aluminum alloy drop center pneumatic tire supporting rim 14 in which the wall thicknesses and shapes of various portions are made to obtain optimum characteristics of the rim 14. Said rim 14 has tire bead suporting flanges 15 and a drop center well portion 16 of conventional form to facilitate mounting and de-mounting of a pneumatic tire on said rim 14.

The outside of the outer ring portion 3 of the die casting 2 is accurately finished, as is the inside of the well 16 so that the rim 14 and the hub and spoke unit 2 will have a dimetrical shrink fit at widely spaced apart areas as shown in FIGS. 3 and 4. In FIG. 3 the rim 14 has an internal locating rib 17 for axially centering the rim 4 and portion 3, said rib 17 being of axial width and radial depth about 0.005 inch less than the axial width and radial depth of the peripheral groove 18 around the portion 3 to define an annular chamber filled with high strength thermosetting resin adhesive which positively locks the rim 14 and hub and spoke unit 2 together against relative rotation and axial movement. In FIG. 4 the rib 17 is omitted and the groove 18 is of about 0.005 radial depth to define the annular chamber for high strength thermosetting resin adhesive.

One important feature of the present invention is that the hub-spoke unit 2 may have shrinkfit and bonded thereto a rim 14 of any desired width between the bead-supporting flanges 15 and of course the die split may be on the circle 19 (see FIG. 1) so that any selected hub 5 configuration may be provided to suit the particular make of motorcycle with which the wheel 1 is to be used.

The outer ring portion 3 of the unit 2 is provided with an internal boss 20 for a radially-drilled hole 20' accommodating the tire valve.

FIGS. 5 and 6 illustrate lightweight rear wheel 21 for a motorcycle having a die cast aluminum alloy hub-spoke unit 22 to the outer ring portion 23 of which the extruded aluminum alloy rim 24 is shrinkfitted and bonded as described in relation of FIGS. 1 to 4. In FIGS. 5 and 6 there is provided a central bearing bore 25 and concentrically therearound the die casting 22 has a steel brake drum insert 26. Openings 27 may be provided in the die casting 22 through which the brake linings may be inspected for wear, said openings 27 having been formed by brake drum locating pins in the die casting die. The spokes 28 integrally connect the hub 29 and outer ring portion 23 with respect to the brake drum insert 26 and the bearing bore 25. The wheel 21 is well-known manner will be provided with a suitable drive means such as a drive spline. The pockets 30 are provided for weight saving and a bearing retainer cap (not shown) will cover the pockets 30.

The rim 24 shown in FIGS. 5 and 6 has safety beads 31 in addition to the bead supporting flanges 32 and drop center well 33. It is to be understood that the rim 24 of the FIGS. 1 and 2 wheel may have similar safety beads 31.

The die cast hub-spoke units 2 and 22 are preferably of aluminum-silicon-magnesium alloy such as a modified 360 alloy which provides a good combination of castability, strength, and corrosion resistance.

The die castings 2 and 22 have smooth surfaces and a high degree of accuracy to minimize the amount of metal removal on machined surfaces, e.g. the center bearing bores 10 and 25 and the O.D. of the outer ring portions 3 and 23 for shrinkfit purposes with respect to the respective rims 14 and 24.

Insofar as the extruded aluminum alloy rim 14 or 24 is concerned, it is preferably magnesium-silicon-aluminum alloy No. 6061-T6 or -T651. The extrusion die is designed to provide for optimum distribution of the metal. After extrusion the extruded bar is cut to desired length and is stretched beyond its yield point to straighten the same. The straightened bar may then be placed in an oven for appropriate heat treatment whereafter the bar is ready to be rolled into a rim followed by truing the ends and flash butt welding the ends together. The butt weld is then finished and the wheel 1 or 21 is sized by subjecting the rim 14 or 24 to a 2-3% stretch. Then, the sized rim 14 or 24 is finished on its I.D. as in FIG. 3 or 4 to have a shrink fit with respect to the O.D. of the hub-spoke unit 2 or 22 and to define the bonding chamber 18.

By making the rim 14 or 24 of extruded aluminum alloy as aforesaid, the rim is of great strength in all directions and has desired ductility and elongation. All of the surfaces of the rim 14 or 24 are sufficiently smooth finish as not to require any finishing operations except for the machining of the I.D. of the well 16 or 33 as in FIG. 3 or 4 to provide the required shrinkfit and for bonding. By providing the shrinkfit seizing or galling is avoided as would be encountered in pressfitting an aluminum alloy rim onto an aluminum alloy die casting.

In the manufacture of the wheel 1 or 21 herein a high strength adhesive (or so-called "structural" adhesive) in paste form is applied by brush, trowel, or knife in the groove 18 (FIG. 3 or FIG. 4) to about 0.010 inch thickness. The rim 14 is then heated to expand the same so that it may be positioned around portion 3 of the hub and spoke unit. As the rim 14 cools, it shrinks onto the portion 3 to provide the shrink fit at the widely spaced areas adjacent the ends of groove 18. As the rim 14 shrinks, it applies pressure on the adhesive in chamber 18 and squeezes out excess adhesive through the decreasing gaps of the shrink fit surfaces of the rim 14 and portion 3.

As a final operation, the wheel 1 or 21 is placed in an oven for curing of the adhesive which is confined under pressure in chamber 18 and thereby providing a wheel 1 or 21 in which the rim 14 or 24 and hub and spoke unit 2 or 22 are positively locked against relative movement by shrink fitting and bonding even under severe load conditions including shock loads. When the completed wheel 1 or 21 cools to ambient temperature it shrinks and thus maintains the cured adhesive under pressure in the closed chamber 18.

By way of illustrative example, the thermosetting resin adhesive may be a modified epoxy resin such as HI-FLEX 2214 (3M Company) or CYBOND X-10255-191-1 (American Cyanamid Company) or a vinyl/-phenolic base resin such as PLIOBOND 9001 (The Goodyear Tire and Rubber Company). These resins can be cured at temperatures between about 200° F. and 400° F. with curing times decreasing with increasing temperature. These or other suitable thermosetting resins with appropriate silane adhesion promotors are listed below:

Diallyl Phthalate (DAP) . . .
Epoxide, Cycloaliphatic . . .
Epoxy . . .
Melamine . . .
Phenolic . . .
Polybenzimidazole . . .
Polybutadiene . . .
Polyester . . .
Polyethylene, Crosslinked . . .
Polyimide . . .

The embodiments of the invention in which an exclusive property of privilege is claimed are defined as follows:

1. A lightweight wheel comprising a die cast aluminum alloy hub-spoke unit having a central hub portion and an outer circular ring portion integrally connected together in coaxial relation by radially extending spokes; and an extruded aluminum alloy drop center rim having an inside diameter which is a shrink fit around widely spaced axial ends of the outside diameter of said ring portion to retain said rim and hub portion in coaxial relation and to preclude relative axial and rotary movement of said rim and unit by axial and torque loads on said wheel; said rim and ring portion between said axial ends having concentric radially spaced apart cylindrical surfaces which define a radially thin and axially wide annular chamber between said axial ends; and a thermosetting resin adhesive bonded to and confined under pressure in said annular chamber additionally to lock said rim and hub-spoke unit together; the cylindrical surface of said ring portion being defined by a peripheral groove between said axial ends; and the cylindrical surface of said rim being defined by a locating rib thereof which is of axial width slightly less than that of said peripheral groove and which, solely as the result of shrinkfitting of said rim around said ring portion, extends radially inwardly into said peripheral groove to axially lock said rim with respect to said ring portion and to radially squeeze said adhesive between said cylindrical surfaces thus to confine said adhesive under pressure in said annular chamber.

2. The method of making a wheel comprising die casting an aluminum alloy hub-spoke unit to provide coaxial hub and outer ring portions integrally connected by radially extending spokes; forming a length of extruded aluminum alloy having a cross-section corresponding to that of a drop center rim into a circular rim having butt welded ends; applying a layer of thermosetting resin adhesive in paste form around a radially shallow and axially wide peripheral cylindrical groove between widely spaced axial ends of said ring portion; shrinkfitting said rim around said ring portion to frictionally interengage finished outside and inside diameters of said ring portion and rim at said axial ends and to radially squeeze said adhesive in said groove thus to confine said adhesive under pressure in said groove; and heating said rim and unit to cure the pressurized adhesive for bonding to said rim and ring portion between said axial ends; said rim being formed with a locating rib which is of axial width slightly less than that of said groove and which is of radial depth less than that of said groove and which, solely as a result of the shrinkfitting, enters said groove to axially locate said rim with respect to said unit and to radially squeeze the layer of adhesive material as aforesaid, the radial thickness of the layer of adhesive applied around said groove being substantially greater than the radial thickness of the annular chamber defined between said groove and said locating rib upon shrinkfitting of said rim around said ring portion.

* * * * *